(12) United States Patent
Ohshita

(10) Patent No.: US 7,102,827 B2
(45) Date of Patent: Sep. 5, 2006

(54) EYEPIECE LENS

(75) Inventor: Kouichi Ohshita, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/892,175

(22) Filed: Jul. 16, 2004

(65) Prior Publication Data

US 2005/0013011 A1   Jan. 20, 2005

(30) Foreign Application Priority Data

Jul. 18, 2003   (JP) .............................. 2003-199236
Jul. 5, 2004   (JP) .............................. 2004-198344

(51) Int. Cl.
*G02B 25/00* (2006.01)

(52) U.S. Cl. ...................................... 359/645; 359/643

(58) Field of Classification Search ......... 359/643–645
See application file for complete search history.

(56) References Cited

U.S. PATENT DOCUMENTS 5,815,317 A * 9/1998 Omura ....................... 359/645
6,130,785 A * 10/2000 Abe et al. ................... 359/646
6,263,168 B1 * 7/2001 Hasushita et al. ........... 396/382

FOREIGN PATENT DOCUMENTS

| JP | 9-329752 | 12/1997 |
|---|---|---|
| JP | 11-109259 | 4/1999 |
| JP | 2000-098266 | 4/2000 |
| JP | 2001-100115 | 4/2001 |

* cited by examiner

*Primary Examiner*—Ricky Mack
*Assistant Examiner*—M. Hasan
(74) *Attorney, Agent, or Firm*—Miles & Stockbridge P.C.

(57) ABSTRACT

The object of the present invention is to provide an eyepiece lens having a large pupil diameter of 10 mm or more, securing higher magnification, equipped with a high quality diopter adjustment function at low cost. The eyepiece lens includes, in order from an eye point side EP, a negative meniscus lens L1 having a concave surface facing to the eye point side EP, a double convex lens L2, and a negative lens L3. Diopter of the eyepiece lens is adjusted by moving the double convex lens L2 along an optical axis. At least one surface of the double convex lens L2 has an aspherical surface having positive refractive power getting weaker in accordance with increase in a distance to the surface from the optical axis, and given conditional expressions are satisfied.

18 Claims, 12 Drawing Sheets

EYEPIECE LENS

The disclosures of the following priority applications are herein incorporated by reference:

Japanese Patent Application No. 2003-199236 filed on Jul. 18, 2003 and

Japanese Patent Application No. 2004-198344 filed on Jul. 5, 2004.

BACKGROUND OF THE INVENTION

1. Field of the Invention

The present invention relates to an eyepiece lens and in particular to an eyepiece lens suitable for the use in a viewfinder of a single-lens-reflex camera.

2. Related Background Art

In a viewfinder of a single-lens-reflex camera, since a shooting lens serves as an objective of the viewfinder, it has such features that lens can easily be changed without generating parallax even in a telephotograph or a close-up, so that it has become a mainstream of a camera with interchangeable lens system.

A viewfinder of a single-lens-reflex camera is a real image viewfinder observing an enlarged image of a real image formed by a shooting lens through an eyepiece having positive refractive power. Generally, the viewfinder is constructed such that an inverted image formed by a shooting lens is erected by a quick return mirror and a roof pentagonal prism and an enlarged erecting image is observed through an eyepiece lens constructed by an achromatic cemented positive lens.

As gaining popularity of camera in senior people, the request for a viewfinder to be able to adjust its diopter becomes increasingly strong. An eyepiece lens constructed by three lens groups, in order from an eye point, a negative lens group, a positive lens group, and a negative lens group, diopter of which can be adjusted by moving the positive lens group has been known.

A conventional eyepiece lens capable of adjusting diopter has a drawback that magnification is low relative to that of an eyepiece with fixed diopter. Moreover, since the diameter of a pupil is only about 4 mm, when the pupil of a photographer is opened widely in a dark place, or when an eye of a photographer and exit pupil of an eyepiece lens are shifted with each other, appearance of the image in the viewfinder becomes severely deteriorated. In order to overcome the aforementioned defects, eyepiece lenses have been proposed in the following patent documents such as Japanese Patent Application Laid-Open Nos. 2000-98266 and 2001-100115.

However, in an eyepiece lens disclosed in Japanese Patent Application Laid-Open No. 2000-98266, the eyepiece lens using an aspherical lens made of resin has high optical performance at reasonable cost, but magnification is slightly low. Moreover, in an eyepiece lens disclosed in Japanese Patent Application Laid-Open No. 2001-100115, magnification is also slightly low and an aspherical lens made of a glass material is used, so that it becomes costly.

SUMMARY OF THE INVENTION

The present invention is made in view of the aforementioned problems and has an object to provide an eyepiece lens having a pupil diameter of 10 mm or more, securing a higher magnification, and including a high quality diopter adjusting function at reasonable cost.

According to one aspect of the present invention an eyepiece lens includes, in order from an eye point side, a negative meniscus lens having a concave surface facing to the eye point side, a double convex lens, and a negative lens. Diopter of the eyepiece lens is adjusted by moving the double convex lens along an optical axis. At least one surface of the double convex lens has an aspherical surface having positive refractive power getting weaker in accordance with increase in a distance to the surface from the optical axis, and the following conditional expressions (1) through (4) are satisfied:

$$0.22 < d2/f2 < 0.32 \tag{1}$$

$$-4.2 < S1 < -2.6 \tag{2}$$

$$0.2 < S2 < 0.35 \tag{3}$$

$$-1.2 < S3 < -0.3 \tag{4}$$

where d2 denotes the thickness of the negative meniscus lens along the optical axis, f2 denotes the focal length of the double convex lens, S1 denotes a shape factor of the negative meniscus lens, S2 denotes a shape factor of the double convex lens, S3 denotes a shape factor of the negative lens, and each shape factor is expressed by the following expression:

$$S = (re + rs)/(re - rs)$$

where re denotes a radius of curvature of the eye point side surface and rs denotes a radius of curvature of the object side surface, and when the surface is an aspherical surface, a paraxial radius of curvature is used for the calculation.

In one preferred embodiment of the present invention, the double convex lens is constructed by a resin material and the following conditional expressions (5) and (6) are preferably satisfied:

$$1.5 < n2 < 1.55 \tag{5}$$

$$52 < v2 < 60 \tag{6}$$

where n2 denotes refractive index of the double convex lens at d-line (wavelength $\lambda = 587.6$ nm) and v2 denotes Abbe number of the double convex lens at d-line (wavelength $\lambda = 587.6$ nm).

In one preferred embodiment of the present invention, the following conditional expression (7) is preferably satisfied:

$$0.28 < d4/f2 < 0.36 \tag{7}$$

where d4 denotes a thickness of the double convex lens along the optical axis.

According to another aspect of the present invention, an eyepiece lens comprising, in order from an eye point side, a negative meniscus lens having a concave surface facing to the eye point side, a double convex lens, and a negative lens. Diopter of the eyepiece lens is adjusted by moving the double convex lens along an optical axis. The double convex lens is constructed by a resin material. At least one surface of the double convex lens has an aspherical surface with positive refractive power getting weaker in accordance with increase in a distance to the surface from the optical axis, and the following conditional expressions (5) through (7) are satisfied:

$$1.50 < n2 < 1.55 \tag{5}$$

$$52 < v2 < 60 \tag{6}$$

$$0.28 < d4/f2 < 0.36 \tag{7}$$

where n2 denotes refractive index of the double convex lens at d-line (wavelength $\lambda$=587.6 nm), $\nu$2 denotes Abbe number of the double convex lens at d-line (wavelength $\lambda$=587.6 nm), d4 denotes a thickness of the double convex lens along the optical axis, and f2 denotes the focal length of the double convex lens.

In one preferred embodiment of the present invention, the following conditional expressions (1) and (2) are preferably satisfied:

$$0.22 < d2/f2 < 0.32 \quad (1)$$

$$-4.2 < S1 < -2.6 \quad (2)$$

where d2 denotes the thickness of the negative meniscus lens along the optical axis, S1 denotes a shape factor of the negative meniscus lens, and each shape factor is expressed by the following expression:

$$S = (re+rs)/(re-rs)$$

where re denotes a radius of curvature of the eye point side surface and rs denotes a radius of curvature of the object side surface, and when the surface is an aspherical surface, a paraxial radius of curvature is used for the calculation.

In one preferred embodiment of the present invention, the following conditional expressions (8) and (9) are preferably satisfied:

$$-22 < \nu1 - \nu2 < -6 \quad (8)$$

$$30 < \nu2 - \nu3 < 35 \quad (9)$$

where $\nu$1 denotes Abbe number of the negative meniscus lens at d-line (wavelength $\lambda$=587.6 nm), $\nu$2 denotes Abbe number of the double convex lens at d-line (wavelength $\lambda$=587.6 nm), and $\nu$3 denotes Abbe number of the negative lens at d-line (wavelength $\lambda$=587.6 nm).

According to another aspect of the present invention an eyepiece lens includes, in order from an eye point side, a negative meniscus lens having a concave surface facing to the eye point side, a double convex lens, and a negative lens. Diopter of the eyepiece lens is adjusted by moving the double convex lens along an optical axis. A prism is disposed adjacent to the object side of the negative lens, and the following conditional expressions (10) and (11) are satisfied:

$$1.6 < n4 < 1.85 \quad (10)$$

$$25 < \nu4 < 50 \quad (11)$$

where n4 denotes refractive index of the prism at d-line (wavelength $\lambda$=587.6 nm) and $\nu$4 denotes Abbe number of the prism at d-line (wavelength $\lambda$=587.6 nm).

In one preferred embodiment of the present invention, the following conditional expressions (1) through (4) are preferably satisfied:

$$0.22 < d2/f2 < 0.32 \quad (1)$$

$$-4.2 < S1 < -2.6 \quad (2)$$

$$0.2 < S2 < 0.35 \quad (3)$$

$$-1.2 < S3 < -0.3 \quad (4)$$

where d2 denotes the thickness of the negative meniscus lens along the optical axis, f2 denotes the focal length of the double convex lens, S1 denotes a shape factor of the negative meniscus lens, S2 denotes a shape factor of the double convex lens, S3 denotes a shape factor of the negative lens, and each shape factor is expressed by the following expression:

$$S = (re+rs)/(re-rs)$$

where re denotes a radius of curvature of the eye point side surface and rs denotes a radius of curvature of the object side surface, and when the surface is an aspherical surface, a paraxial radius of curvature is used for the calculation.

In one preferred embodiment of the present invention, the double convex lens is constructed by a resin material and the following conditional expressions (5) and (6) are satisfied:

$$1.5 < n2 < 1.55 \quad (5)$$

$$52 < \nu2 < 60 \quad (6)$$

where n2 denotes refractive index of the double convex lens at d-line (wavelength $\lambda$=587.6 nm) and $\nu$2 denotes Abbe number of the double convex lens at d-line (wavelength $\lambda$=587.6 nm).

Other feature and advantages according to the present invention will be readily understood from the detailed description of the preferred embodiments in conjunction with the accompanying drawings.

DESCRIPTION OF THE PREFERRED EMBODIMENTS

Figure 1:
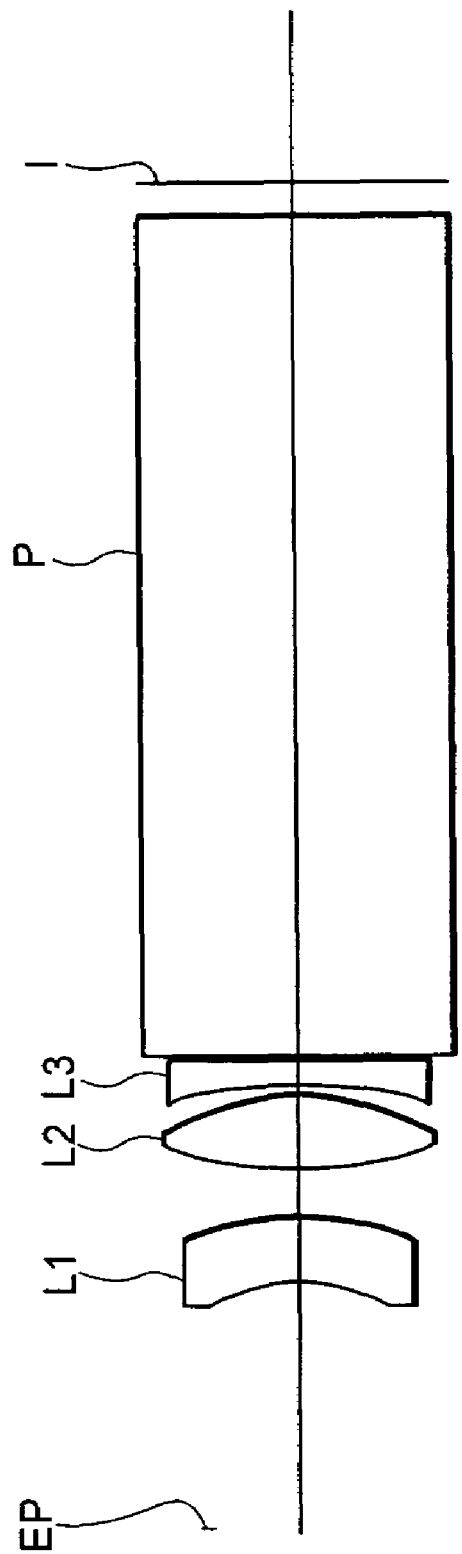
FIG. 1 is a diagram showing an eyepiece lens according to Example 1 of the present invention.

An eyepiece lens system according to an embodiment of the present invention is explained below with reference to accompanying drawings.

An eyepiece lens system according to an embodiment of the present invention includes, in order from an eye point side, a negative meniscus lens having a concave surface facing to the eye point, a double convex lens, and a negative lens. At least one surface of the double convex lens has an aspherical surface with positive refractive power getting weaker in accordance with increase in a distance to the surface from the optical axis. Diopter can be adjusted by moving the double convex lens.

In a conventional three-group type eyepiece lens constructed by negative, positive, and negative lens groups, the object side surface of a first negative lens locating to the most eye point side has a strong concave surface. The radius of curvature of the object side surface of the first negative lens is close to that of the eye point side surface of the positive lens, or that of the object side surface of the positive lens is close to that of the eye point side surface of the second negative lens. Since high order spherical aberration and coma are produced at these surfaces, it has been difficult to preferably correct such aberrations concerning a large pupil diameter.

In an eyepiece lens according to an embodiment of the present invention, a first negative lens locating to the eye point side is a negative meniscus lens having a concave surface facing to the eye point, and radii of curvature of the opposite surfaces of the negative meniscus lens and a double convex lens as the positive lens have different signs with each other so as to suppress production of high order spherical aberration and coma. However, when such construction is used, correction of spherical aberration tends to be insufficient. Accordingly, at least one surface of the double convex lens is formed an aspherical surface having positive refractive power getting weaker in accordance with increase in a distance to the surface from the optical axis so as to be able to correct spherical aberration preferably.

In a conventional three-group type eyepiece lens constructed by negative, positive, and negative lens groups, when the refractive power of the first negative lens locating to the most eye point side becomes strong, it is effective to obtain high magnification. However, when refractive power of the first negative lens is strong, variation in diopter relative to the movement of the positive lens becomes small, so it has been difficult to secure a wide adjustable range of diopter with keeping high magnification.

In an eyepiece lens according to an embodiment of the present invention, the first negative lens is a negative meniscus lens having a concave surface facing to the eye point and the thickness of the negative meniscus lens along the optical axis is made to be thick, so that the object side surface has positive refractive power and the eye point side surface has negative refractive power. Accordingly, since the negative meniscus lens itself has a Galilean type telescopic effect from the object side, high magnification can be secured with weakening the refractive power of the negative meniscus lens as the first negative lens.

Various conditional expressions being satisfied by an eyepiece lens according to an embodiment of the present invention are explained below.

In an eyepiece lens according to an embodiment of the present invention, the following conditional expressions (1) through (4) are satisfied:

$$0.22 < d2/f2 < 0.32 \quad (1)$$

$$-4.2 \leq S1 < -2.6 \quad (2)$$

$$0.2 \leq S2 < 0.35 \quad (3)$$

$$-1.2 \leq S3 < -0.3 \quad (4)$$

where d2 denotes the thickness of the negative meniscus lens along the optical axis, f2 denotes the focal length of the double convex lens, S1 denotes a shape factor of the negative meniscus lens, S2 denotes a shape factor of the double convex lens, S3 denotes a shape factor of the negative lens, and each shape factor is expressed by the following expression:

$$S=(re+rs)/(re-rs)$$

where re denotes a radius of curvature of the eye point side surface and rs denotes a radius of curvature of the object side surface, and when the surface is an aspherical surface, a paraxial radius of curvature is used for the calculation.

Conditional expression (1) defines an appropriate range of the thickness along the optical axis of the negative meniscus lens. When the ratio d2/f2 is equal to or falls below the lower limit of conditional expression (1), high magnification cannot be obtained or refractive power of each lens becomes large, so it becomes difficult to correct various aberrations. On the other hand, when the ratio d2/f2 is equal to or exceeds the upper limit of conditional expression (1), the thickness along the optical axis of the negative meniscus lens becomes excessively large, so the eyepiece lens becomes large. In addition, it becomes difficult to secure the distance to the eye point to be long enough.

Conditional expression (2) defines an appropriate range of the shape of the negative meniscus lens. When the value S1 is equal to or exceeds the upper limit of conditional expression (2), spherical aberration and coma corresponding to a large pupil diameter become difficult to be corrected preferably. On the other hand, when the value S1 is equal to or falls below the lower limit of conditional expression (2), the radius of curvature of the eye point side surface of the negative meniscus lens becomes excessively small, so it becomes difficult to secure the distance to the eye point to be long enough.

Conditional expression (3) defines an appropriate range of the shape of the double convex lens. When the value S2 is equal to or exceeds the upper limit of conditional expression (3), or when the value is equal to or falls below the lower limit of conditional expression (3), it becomes difficult to suppress variation in aberration with keeping high magnification upon varying diopter.

Conditional expression (4) defines an appropriate range of the shape of the negative lens. When the value S3 is equal to or exceeds the upper limit of conditional expression (4), or when the value is equal to or falls below the lower limit of conditional expression (4), it becomes difficult to preferably correct astigmatism that is the most important factor for the appearance of the viewfinder image.

Moreover, in an eyepiece lens according to an embodiment of the present invention, the following conditional expressions (5) through (9) are preferably satisfied:

$$1.5 < n2 < 1.55 \quad (5)$$

$$52 < v2 < 60 \quad (6)$$

$$0.28 < d4/f2 < 0.36 \quad (7)$$

$$-22 < v1 - v2 < -6 \quad (8)$$

$$30 < v2 - v3 < 35 \quad (9)$$

where n2 denotes refractive index of the double convex lens at d-line (wavelength $\lambda=587.6$ nm), v1 denotes Abbe number of the negative meniscus lens at d-line (wavelength $\lambda=587.6$ nm), v2 denotes Abbe number of the double convex lens at d-line (wavelength $\lambda=587.6$ nm), and v3 denotes Abbe number of the +negative lens at d-line (wavelength λ=587.6 nm), d4 denotes a thickness of the double convex lens along the optical axis, f2 denotes the focal length of the double convex lens.

Conditional expressions (5) and (6) define selection condition for a resin material when the double convex lens is made of a resin material. Conditional expression (5) defines an appropriate range of refractive index of the resin material. Conditional expression (6) defines an appropriate range of Abbe number of the resin material at d-line (wavelength λ=587.6 nm). When the value v2 is equal to or exceeds the upper limit of conditional expression (6) or when the value is equal to or falls below the lower limit of conditional expression (6), it becomes difficult to correct chromatic aberration preferably, so it is undesirable. When the value n2 is equal to or exceeds the upper limit of conditional expression (5) under the condition that the value v2 satisfies conditional expression (6), an available resin material does not actually exist, so it becomes difficult to provide an eyepiece lens at reasonable cost. When the value n2 is equal to or falls below the lower limit of conditional expression (5) under the condition that the value v2 satisfies conditional expression (6), refractive index becomes excessively small, so it becomes difficult to correct various aberrations preferably.

For example, a resin material of a cycloolefin system has been known to satisfy both conditional expressions (5) and (6) at a time and has a characteristic to be low hygroscopic. When an eyepiece lens according to an embodiment of the present invention is constructed by a resin material, it is preferable that the resin material of a cycloolefin system is used for the material of the double convex lens.

Conditional expression (7) defines a ratio of the thickness along the optical axis to the focal length of the double convex lens. When the ratio d4/f2 is equal to or falls below the lower limit of conditional expression (7), it means the thickness along the optical axis of the double convex lens is thin and the focal length of the double convex lens is long, so that sufficiently high magnification cannot be obtained. On the other hand, when the ratio d4/f2 is equal to or exceeds the upper limit of conditional expression (7), it means the thickness along the optical axis of the double convex lens is thick and the focal length of the double convex lens is short, so that it is effective to obtain a wide angle of view and high magnification, but it becomes difficult to mold when the double convex lens is molded with a resin material.

In an eyepiece lens according to an embodiment of the present invention, it is preferable that conditional expressions (8) and (9) are satisfied to correct chromatic aberration preferably.

Conditional expression (8) relates to correction of lateral chromatic aberration. When the value v1−v2 is equal to or exceeds the upper limit of conditional expression (8) or when the value v1−v2 is equal to or falls below the lower limit of conditional expression (8), it becomes difficult to correct lateral chromatic aberration preferably.

Conditional expression (9) relates to correction of on-axis chromatic aberration. When the value v2−v3 is equal to or exceeds the upper limit of conditional expression (9), or when the value v2−v3 is equal to or falls below the lower limit of conditional expression (9), it becomes difficult to correct on-axis chromatic aberration.

By the way, in an eyepiece lens for a single lens reflex camera, a pentagonal prism is arranged between the eyepiece lens and an image plane to erect the image. In an eyepiece lens according to an embodiment of the present invention, the following conditional expressions (10) and (11) are preferably satisfied:

$$1.6 < n4 < 1.85 \quad (10)$$

$$25 < v4 < 50 \quad (11)$$

where n4 denotes refractive index of the pentagonal prisim at d-line (wavelength λ=587.6 nm) and v4 denotes Abbe number of the pentagonal prism at d-line (wavelength λ=587.6 nm).

Conditional expressions (10) and (11) define selection of a glass material of the pentagonal prism. In the course of manufacturing process, a pentagonal prism is susceptible to surface stain on each polished surface. When a soft glass material is used, it becomes difficult to obtain high precision. On the other hand, when a hard glass material is used, it takes too much time to polish. Accordingly, it has been difficult to find a new glass material suitable for this purpose. In the present invention, conditional expressions (10) and (11) provide new selection of glass materials instead of a conventional crown glass. When the value n4 is equal to or falls below the lower limit of conditional expression (10), it becomes difficult to keep high magnification since refractive index of the prism becomes lower. On the other hand, when the value n4 is equal to or exceeds the upper limit of conditional expression (10), it is effective for magnification to be high, but it is difficult to manufacture since hardness of the glass material increases. It is preferable that the upper limit of condition expression (10) is 1.75.

When the value v4 is equal to or exceeds the upper limit of conditional expression (11), it is effective to correct chromatic aberration, but it becomes difficult to manufacture since the glass material becomes susceptible to surface stain. On the other hand, when the value v4 is equal to or falls below the lower limit of conditional expression (11), it is disadvantageous to correct chromatic aberration, and it becomes difficult to keep high precision upon manufacturing since hardness of the glass material becomes low. It is preferable that the lower limit of conditional expression (11) is 35.

Figure 5:
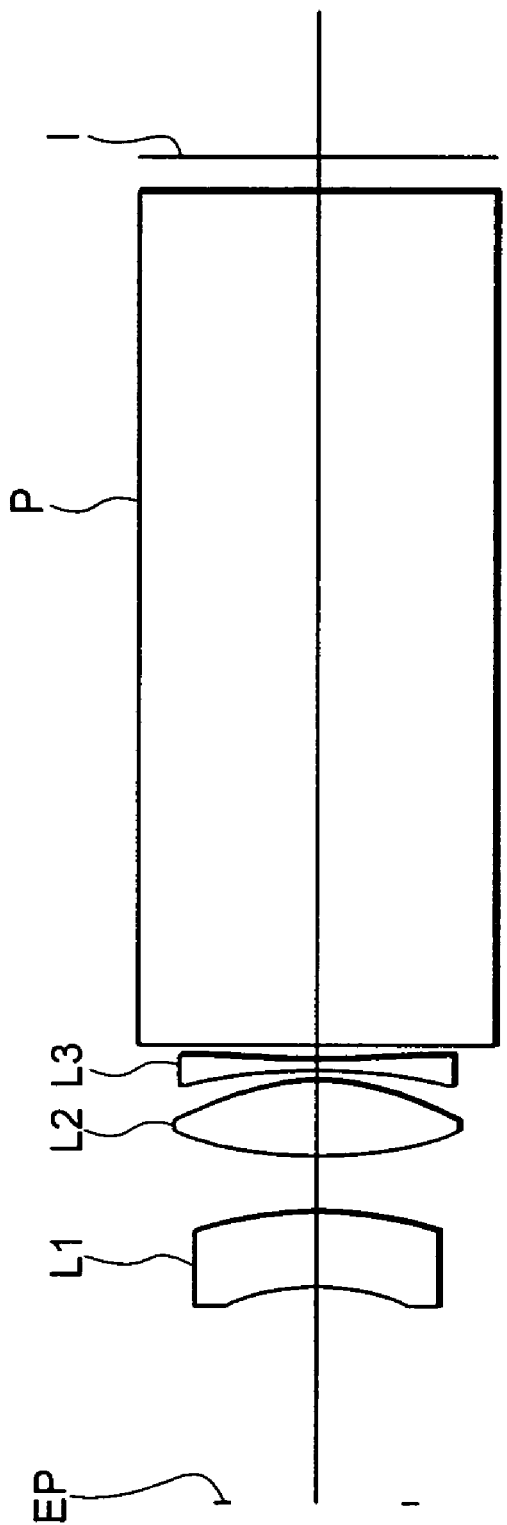
FIG. 5 is a diagram showing an eyepiece lens according to Example 2 of the present invention.
Figure 9:
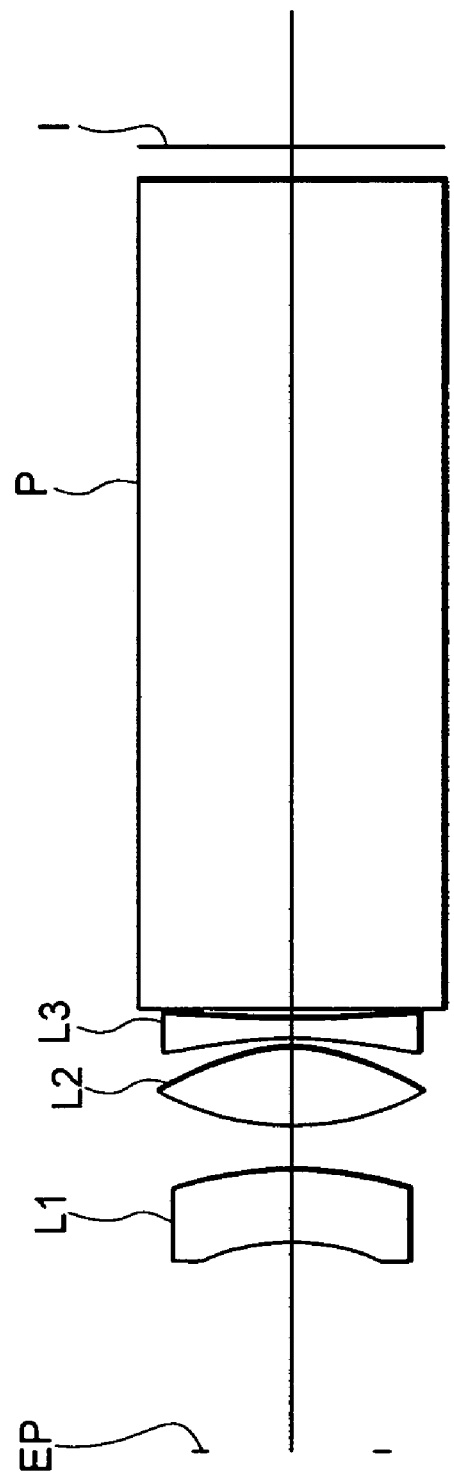
FIG. 9 is a diagram showing an eyepiece lens according to Example 3 of the present invention.

Each example according to the present invention is explained below with reference to accompanying drawings. FIGS. 1, 5, and 9 are drawings showing eyepiece lenses for a single-lens-reflex camera of respective examples according to the present invention. Various values of an eyepiece lens for each Example are listed in Tables shown below. In each Table, the left most column shows surface number in order from the eye point (1$^{st}$ surface), R denotes a radius of curvature, D denotes a distance between surfaces, nd denotes refractive index at d-line (wave length λ=587.6 nm), and vd denotes Abbe number at d-line (wavelength λ=587.6 nm).

An aspherical surface expressed by an asterisk "*" shown in each Table is expressed by the following expression:

$$x=(y^2/R)/[1+(1-Ky^2/R^2)^{1/2}]+C4y^4+C6y^6+C8y^8+C10y^{10}$$

where y denotes a height from the optical axis, x denotes sag value in the direction of the optical axis, R denotes a paraxial radius of curvature (radius of curvature of a reference sphere), K denotes a conical coefficient, C4 denotes an aspherical coefficient of a 4-th order, C6 denotes an aspherical coefficient of a 6-th order, C8 denotes an aspherical coefficient of an 8-th order, and C10 denotes an aspherical coefficient of a 10-th order. In [Aspherical Data], "E-n"

denotes "10$^{-n}$". In [Variable Distance], magnification shows magnification of the viewfinder when an eyepiece is combined with a shooting lens having the focal length of 51.6.

In the tables for various values, "mm" is generally used for the unit of length such as the focal length f, the radius of curvature r, and the separation between optical surfaces d. However, since an optical system proportionally enlarged or reduced its dimension can be obtained similar optical performance, the unit is not necessary to be limited to "mm" and any other suitable unit can be used.

The unit of diopter is the so-called "Diopter". Accordingly, X diopter means an image of the eyepiece is formed at the position of 1/X [unit: m] along the optical axis (the sign is negative when the image is formed to the object side of the eye point).

EXAMPLE 1

In FIG. 1, an eyepiece lens according to Example 1 of the present invention is constructed by a three-group, three elements, in order from the eye point side, a negative meniscus lens L1 having a concave surface facing to the eye point EP, a double convex lens L2, and a negative lens L3. The object side surface of the double convex lens L2 has an aspherical surface having positive refractive power getting weaker in accordance with increase in a distance to the surface from the optical axis. A thick plane parallel plate P corresponding to a pentagonal prism P is arranged to the object side of the negative lens L3. By the way, "I" shown in the figure denotes a real image plane of a shooting lens (not shown). In the present example and in other examples illustrated hereinafter, the pentagonal prism may be replaced by other shaped prism, and in those examples the pentagonal prism P is shown by a developed view.

TABLE 1

[Specifications]
Diopter: −3.0 through +1.0
Pupil Diameter: 18
Eye Point: 26.0
Field Number: 31.4

[Lens Data]

| Surface Number | R | D | vd | nd |
|---|---|---|---|---|
| 1> | ∞ | 26.0000 | | 1.000000 |
| 2) | −18.9983 | 6.8000 | 49.61 | 1.772500 |
| 3) | −31.6613 | D1 | | 1.000000 |
| 4) | 42.2259 | 7.8000 | 56.21 | 1.524440 |
| 5)* | −20.8565 | D2 | | 1.000000 |
| 6) | −52.8638 | 2.6000 | 23.78 | 1.846660 |
| 7) | −1344.2950 | 0.6000 | | 1.000000 |
| 8) | ∞ | 90.9857 | 64.10 | 1.516800 |
| 9) | ∞ | 3.8344 | | 1.000000 |

[Aspherical Data]
Surface Number 5

K = −0.6378
C4 = 0.00000E+00
C6 = 1.82480E−08
C8 = −4.52760E−11
C10 = 4.93070E−14

[Variable Intervals]

| Focal length | 66.392 | 64.378 | 62.579 |
|---|---|---|---|
| Magnification | 0.828 | 0.818 | 0.807 |
| Diopter | −3.000 | −1.000 | 1.000 |
| D1 | 5.500 | 3.360 | 1.000 |
| D2 | 1.000 | 3.140 | 5.500 |

TABLE 1-continued

[Values for Conditional Expressions]

| (1) | d2/f2 | 0.245 |
|---|---|---|
| (2) | S1 | −4.001 |
| (3) | S2 | 0.339 |
| (4) | S3 | −1.082 |
| (5) | n2 | 1.524 |
| (6) | ν2 | 56.210 |
| (7) | d4/f2 | 0.281 |
| (8) | ν1−ν2 | −6.600 |
| (9) | ν2−ν3 | 32.430 |

Figure 2:
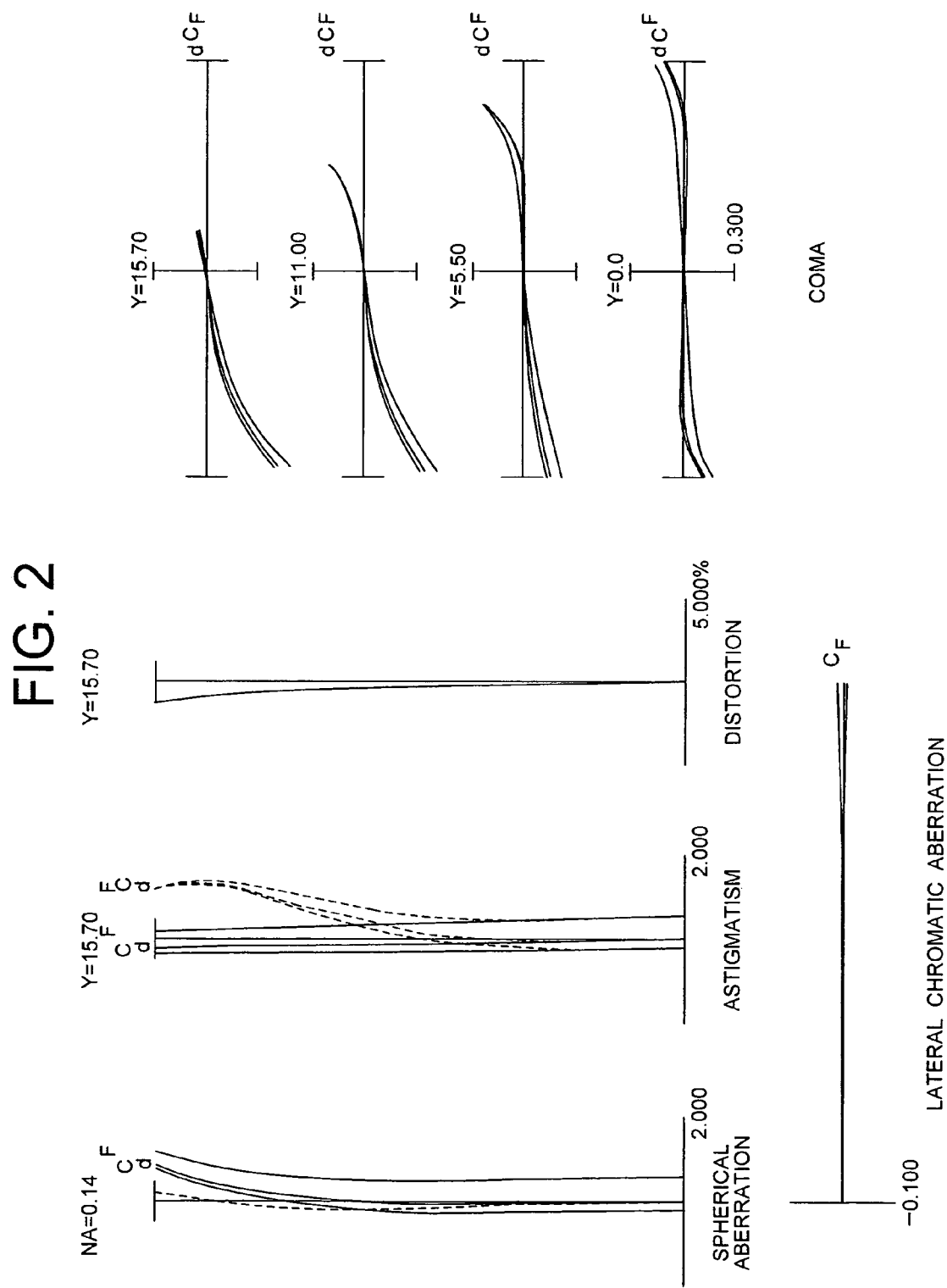
FIG. 2 graphically shows various aberrations of the eyepiece lens according to Example 1 of the present invention at diopter of −3.
Figure 3:
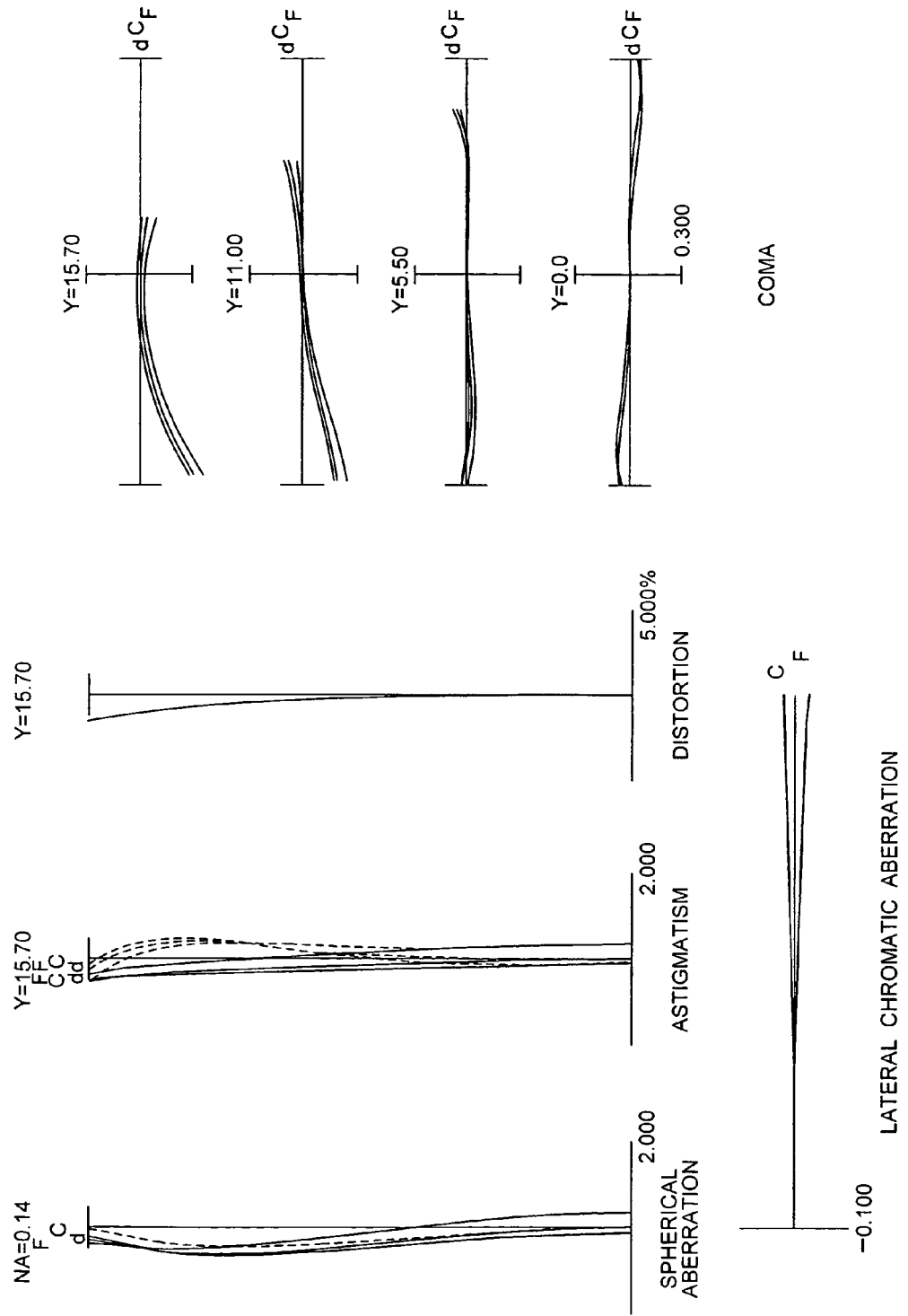
FIG. 3 graphically shows various aberrations of the eyepiece lens according to Example 1 of the present invention at diopter of −1.
Figure 4:
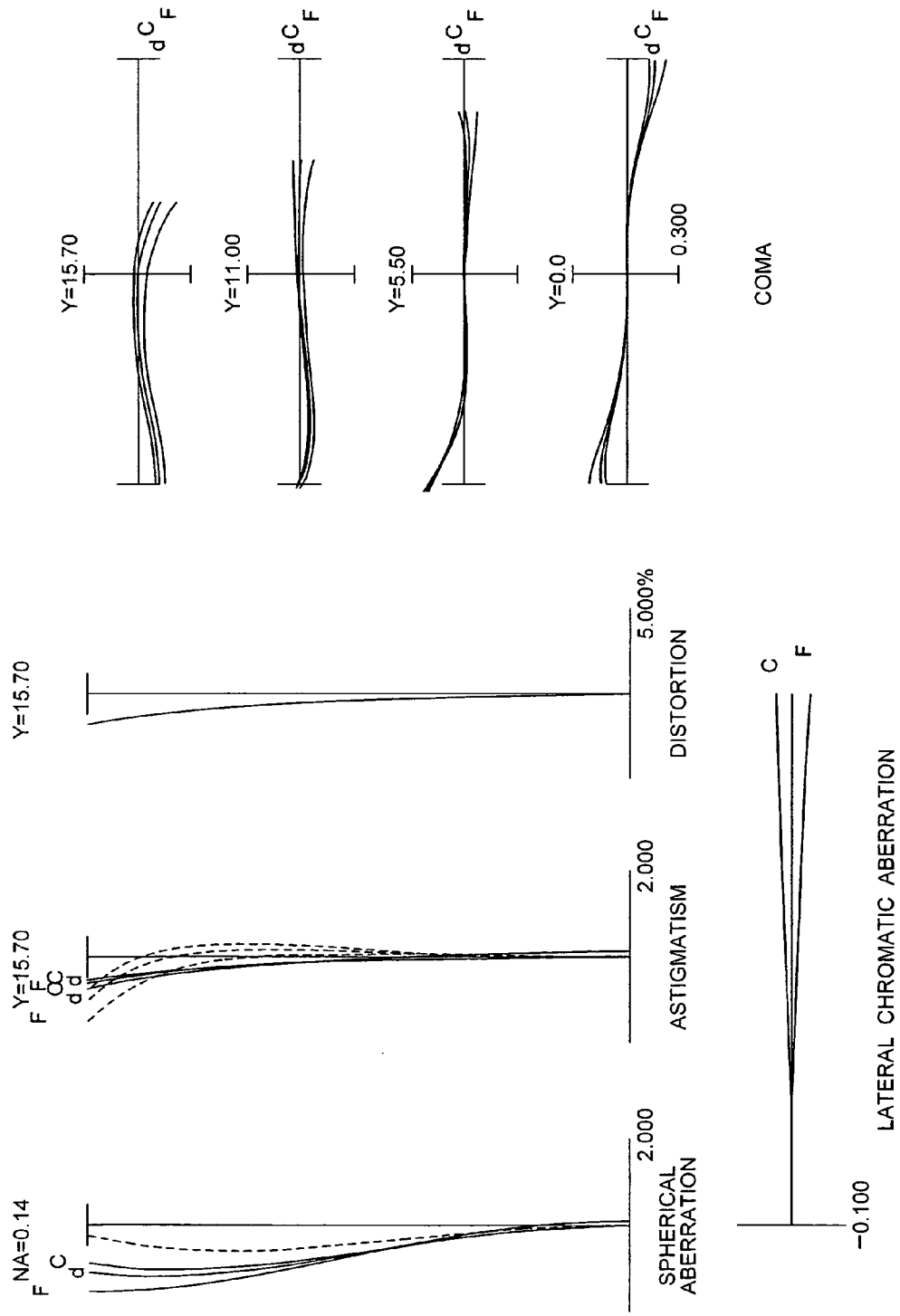
FIG. 4 graphically shows various aberrations of the eyepiece lens according to Example 1 of the present invention at diopter of +1.

FIG. 2 graphically shows various aberrations according to Example 1 at the diopter of −3, FIG. 3 at the diopter of −1, and FIG. 4 at the diopter of +1, respectively.

In each graph, NA denotes numerical aperture, and Y denotes an image height. In the graphs showing astigmatism and distortion, the maximum value of image height Y is shown. Moreover, "d", "g", "C" and "F" denote aberrations at d-line (wavelength λ=587.6 nm), g-line (λ=435.8 nm), C-line (λ=656.3 nm) and F-line (λ=486.1 nm), respectively. In the graph showing astigmatism, a solid line indicates a sagittal image plane and a broken line indicates a meridional image plane. In the graph showing coma, coma at each image height is shown. The above-described explanation regarding various aberration graphs is the same as the other Examples.

As is apparent from the respective graphs, various aberrations are corrected preferably. As is understood from the drawing of the eyepiece shown in FIG. 1, the aberration graphs are corresponding to the case when the light flux fully fills the effective diameter of the eyepiece lens. In the eyepiece lens according to Example 1, since coma and spherical aberration are corrected preferably, drawbacks shown in the conventional viewfinder with adjustable diopter such as degradation in optical performance under dimmer condition, and image-slide of the viewfinder upon shifting an eye from the eye point do not happen any more.

Moreover, as is shown from the aberration graphs, the eyepiece lens according to Example 1 has a merit that distortion is corrected superbly relative to the conventional eyepiece lens, so that it has another merit that nearly comparable distortion correction can be obtained even if a condenser lens locating in the vicinity of the focal plane for correcting distortion is abolished.

EXAMPLE 2

In FIG. 5, an eyepiece lens according to Example 2 of the present invention is constructed by a three-group, three elements, in order from the eye point EP side, a negative meniscus lens L1 having a concave surface facing to the eye point EP, a double convex lens L2, and a negative lens L3. The object side surface of the double convex lens L2 has an aspherical surface having positive refractive power getting weaker in accordance with increase in a distance to the surface from the optical axis. A pentagonal prism P is arranged to the object side of the negative lens L3. By the way, "I" shown in the figure denotes a real image plane of a shooting lens (not shown).

TABLE 2

[Specifications]
Diopter: −3.0 through +1.0
Pupil Diameter: 18
Eye Point: 22.4 through 27.0
Field Number: 34.8
[Lens Data]

| Surface Number | R | D | vd | nd |
|---|---|---|---|---|
| 1> | ∞ | EP | | 1.000000 |
| 2) | −18.9993 | 7.9000 | 42.72 | 1.834810 |
| 3) | −33.6202 | D1 | | 1.000000 |
| 4) | 39.5164 | 7.8000 | 56.21 | 1.524440 |
| 5)* | −20.7635 | D2 | | 1.000000 |
| 6) | −68.2266 | 1.5000 | 22.76 | 1.808090 |
| 7) | 261.0969 | 0.8000 | | 1.000000 |
| 8) | ∞ | 90.9857 | 64.10 | 1.516800 |
| 9) | ∞ | 3.8078 | | 1.000000 |

[Aspherical Data]
Surface Number 5

K = −1.2592
C4 = −5.63230E−06
C6 = 1.79770E−08
C8 = 6.50090E−11
C10 = −2.37080E−13

[Variable Intervals]

| Focal length | 62.753 | 61.479 | 60.413 |
|---|---|---|---|
| Magnification | 0.866 | 0.855 | 0.837 |
| Diopter | −3.000 | −1.000 | 1.000 |
| EP | 22.400 | 24.400 | 27.000 |
| D1 | 5.552 | 3.442 | 1.068 |
| D2 | 0.948 | 3.058 | 5.432 |

[Values for Conditional Expressions]

| (1) | d2/f2 | 0.291 |
|---|---|---|
| (2) | S1 | −3.599 |
| (3) | S2 | 0.311 |
| (4) | S3 | −0.586 |
| (5) | n2 | 1.524 |
| (6) | v2 | 56.210 |
| (7) | d4/f2 | 0.287 |
| (8) | v1−v2 | −13.490 |
| (9) | v2−v3 | 33.450 |

Figure 6:
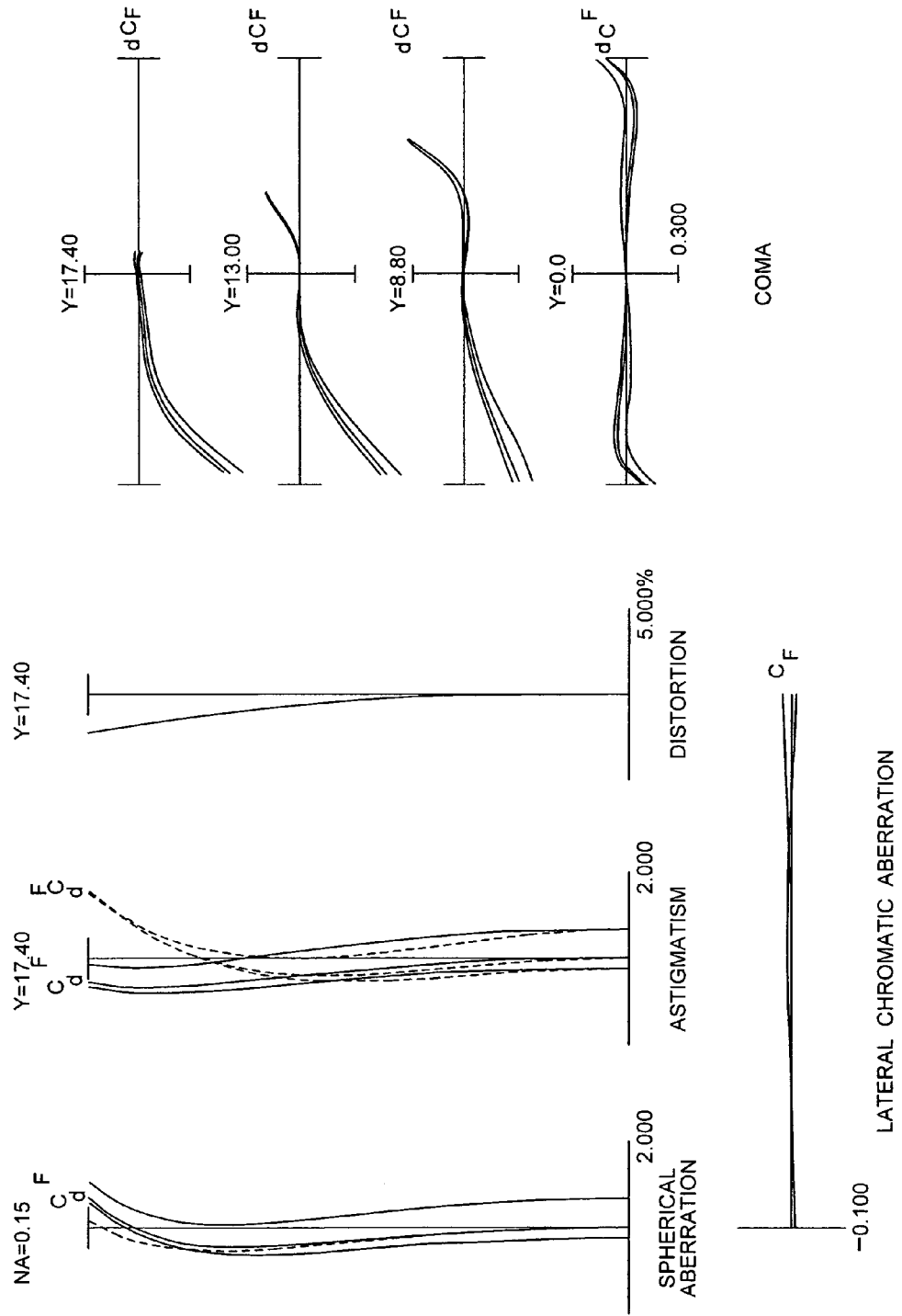
FIG. 6 graphically shows various aberrations of the eyepiece lens according to Example 2 of the present invention at diopter of −3.
Figure 7:
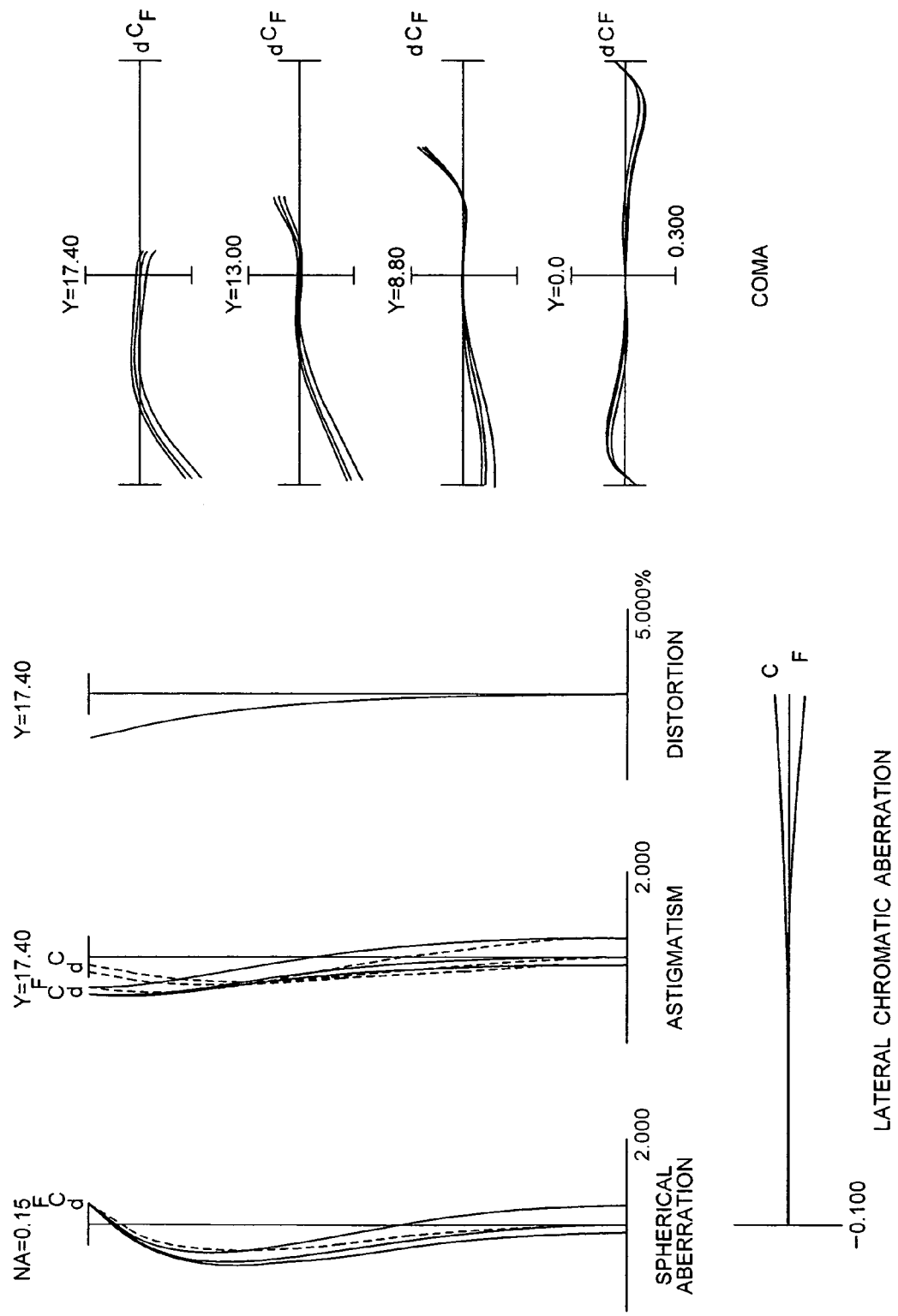
FIG. 7 graphically shows various aberrations of the eyepiece lens according to Example 2 of the present invention at diopter of −1.
Figure 8:
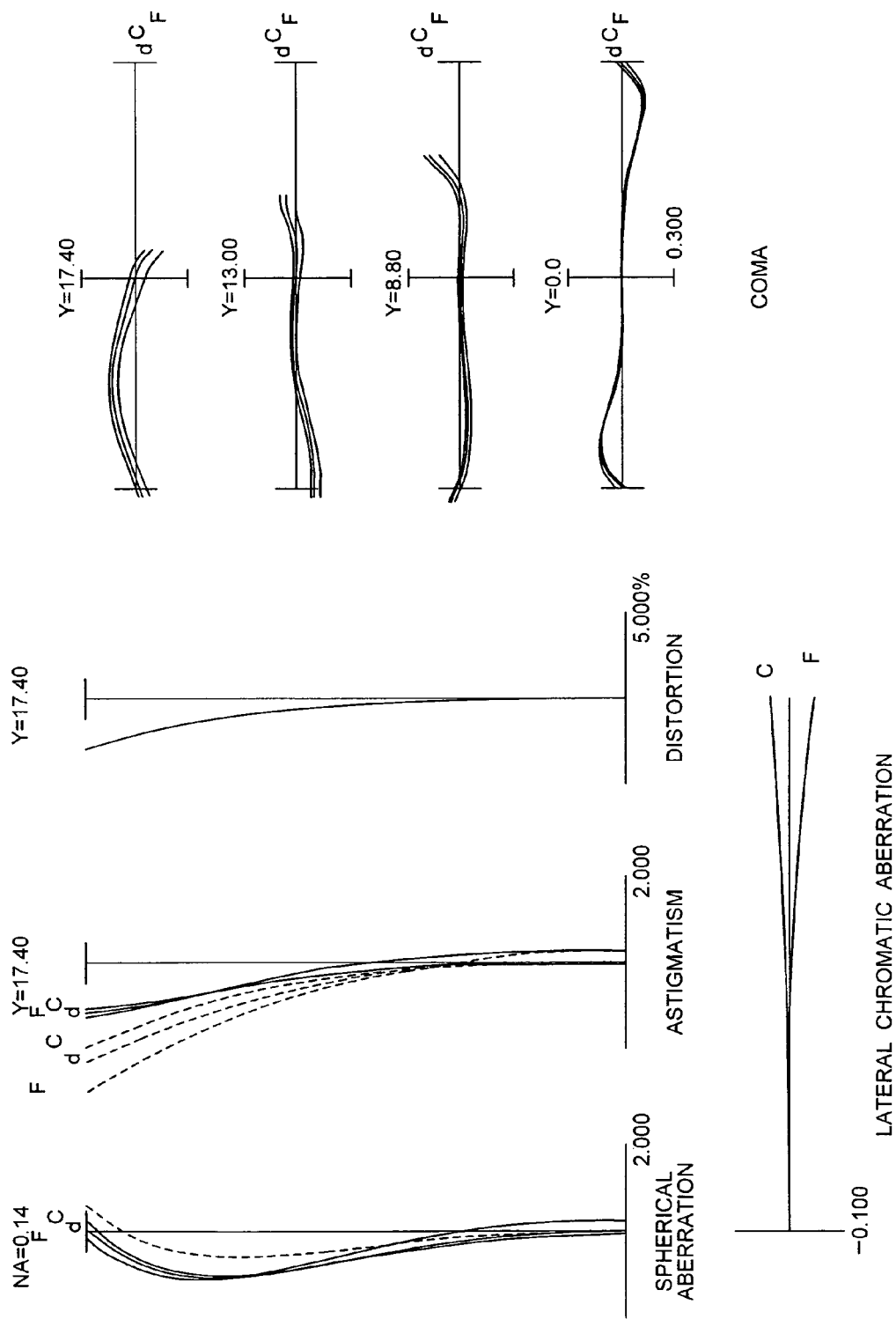
FIG. 8 graphically shows various aberrations of the eyepiece lens according to Example 2 of the present invention at diopter of +1.

FIG. 6 graphically shows various aberrations according to Example 2 at the diopter of −3, FIG. 7 at the diopter of −1, and FIG. 8 at the diopter of +1.

As is apparent from the respective graphs, various aberrations are corrected preferably. As is understood from the drawing of the eyepiece shown in FIG. 5, the aberration graphs are corresponding to the case when the light flux fully fills the effective diameter of the eyepiece lens. In the eyepiece lens according to Example 2, since coma and spherical aberration are corrected preferably, drawbacks shown in the conventional viewfinder with adjustable diopter such as degradation in optical performance under dimmer condition, and image-slide of the viewfinder upon shifting an eye from the eye point do not happen any more.

Moreover, as is shown from the aberration graphs, the eyepiece lens according to Example 2 has a merit that distortion is corrected superbly relative to the conventional eyepiece lens, so that it has another merit that nearly comparable distortion correction can be obtained even if a condenser lens locating in the vicinity of the focal plane for correcting distortion is abolished.

EXAMPLE 3

In FIG. 9, an eyepiece lens according to Example 3 of the present invention is constructed by a three-group, three elements, in order from the eye point EP side, a negative meniscus lens L1 having a concave surface facing to the eye point EP, a double convex lens L2, and a negative lens L3. The object side surface and the eye point EP side surface of the double convex lens L2 have aspherical surfaces, each of which has positive refractive power getting weaker in accordance with increase in a distance to the surface from the optical axis. A thick pentagonal prism P is arranged to the object side of the negative lens L3. By the way, "I" shown in the figure denotes a real image plane of a shooting lens (not shown).

TABLE 3

[Specifications]
Diopter: −3.0 through +1.0
Pupil Diameter: 18
Eye Point: 22.4 through 27.0
Field Number: 31.0
[Lens Data]

| Surface Number | R | D | vd | nd |
|---|---|---|---|---|
| 1> | ∞ | EP | | 1.000000 |
| 2) | −18.9993 | 6.8000 | 37.17 | 1.834000 |
| 3) | −39.4528 | D1 | | 1.000000 |
| 4)* | 31.2846 | 8.0000 | 56.21 | 1.524440 |
| 5)* | −18.7913 | D2 | | 1.000000 |
| 6) | −69.9660 | 2.4000 | 22.76 | 1.808090 |
| 7) | 180.0478 | 0.8000 | | 1.000000 |
| 8) | ∞ | 90.9857 | 42.16 | 1.695000 |
| 9) | ∞ | 3.8067 | | 1.000000 |

[Aspherical Data]

Surface Number 4

K = −1.0829
C4 = 0.00000E+00
C6 = −2.27090E−09
C8 = 1.88270E−12
C10 = −6.64350E−14

Surface Number 5

K = −0.6835
C4 = 0.00000E+00
C6 = 1.16410E−08
C8 = −1.53520E−11
C10 = −1.30920E−13

[Variable Intervals]

| Focal length | 56.722 | 56.585 | 56.889 |
|---|---|---|---|
| Magnification | 0.946 | 0.926 | 0.891 |
| Diopter | −3.000 | −1.000 | 1.000 |
| EP | 22.400 | 24.400 | 27.000 |
| D1 | 5.500 | 3.470 | 1.000 |
| D2 | 1.000 | 3.030 | 5.500 |

[Values for Conditional Expressions]

| (1) | d2/f2 | 0.287 |
|---|---|---|
| (2) | S1 | −2.858 |
| (3) | S2 | 0.249 |
| (4) | S3 | −0.440 |
| (5) | n2 | 1.524 |
| (6) | v2 | 56.210 |
| (7) | d4/f2 | 0.338 |
| (8) | v1−v2 | −19.040 |
| (9) | v2−v3 | 33.450 |

Figure 10:
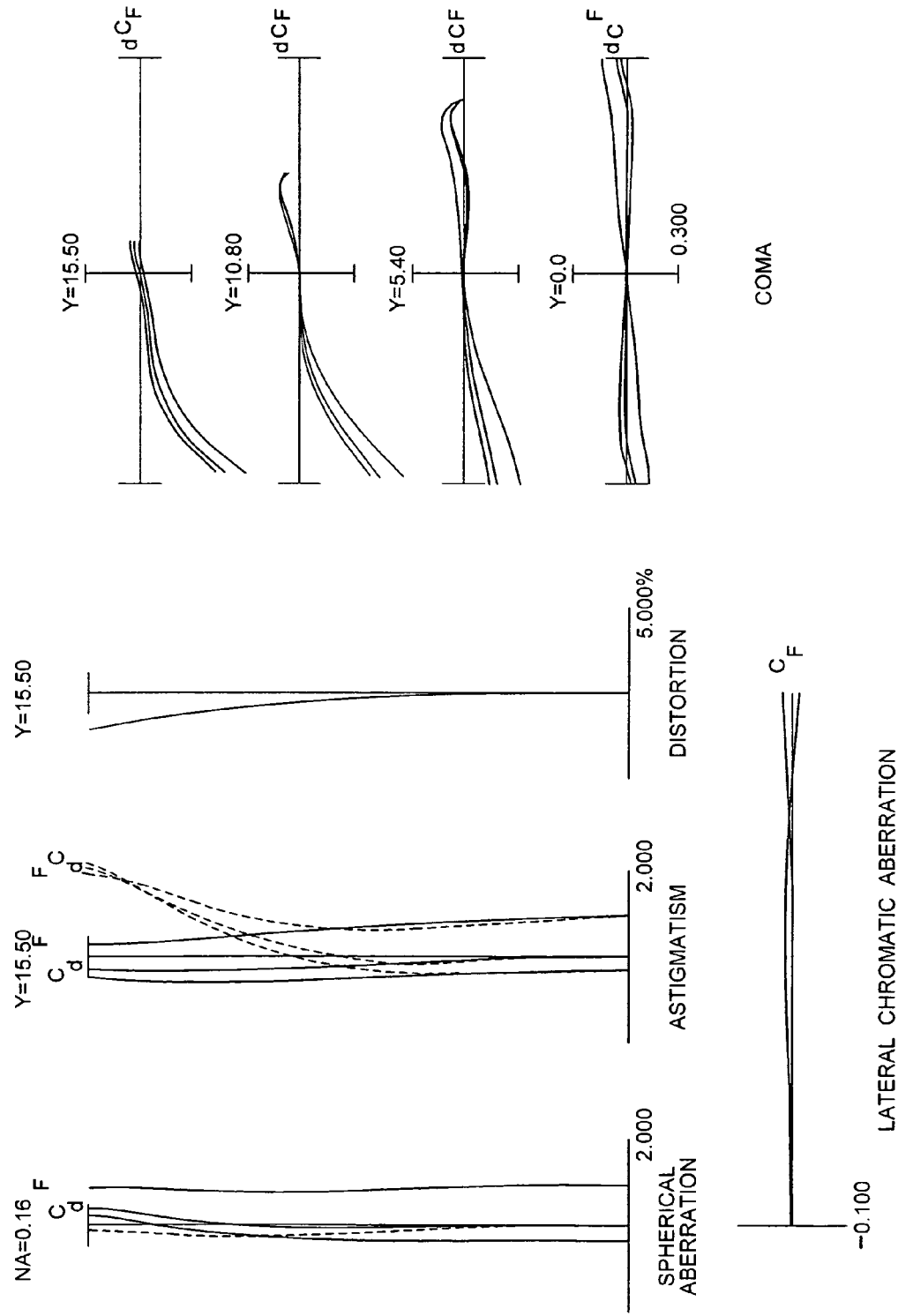
FIG. 10 graphically shows various aberrations of the eyepiece lens according to Example 3 of the present invention at diopter of −3.
Figure 11:
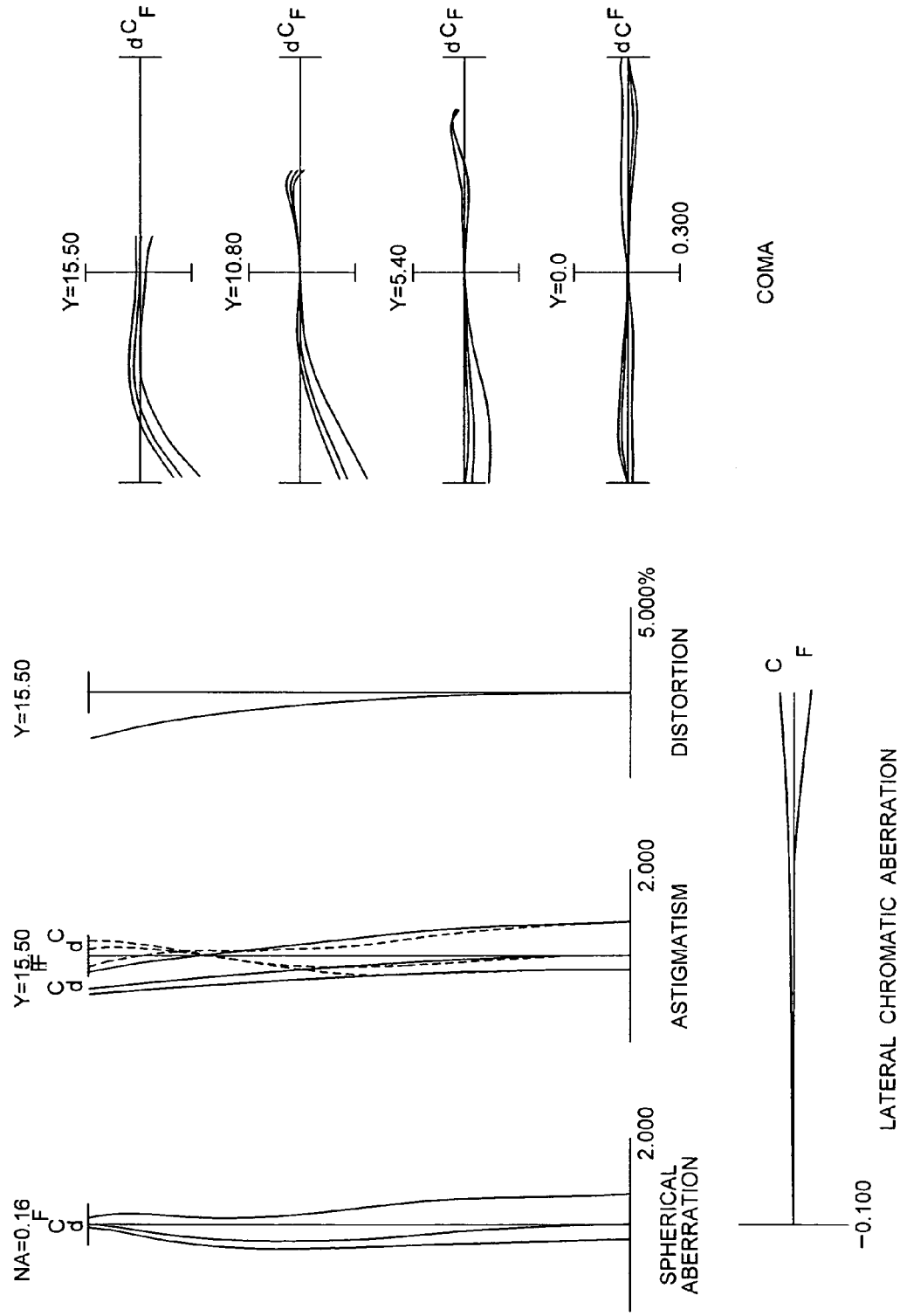
FIG. 11 graphically shows various aberrations of the eyepiece lens according to Example 3 of the present invention at diopter of −1.
Figure 12:
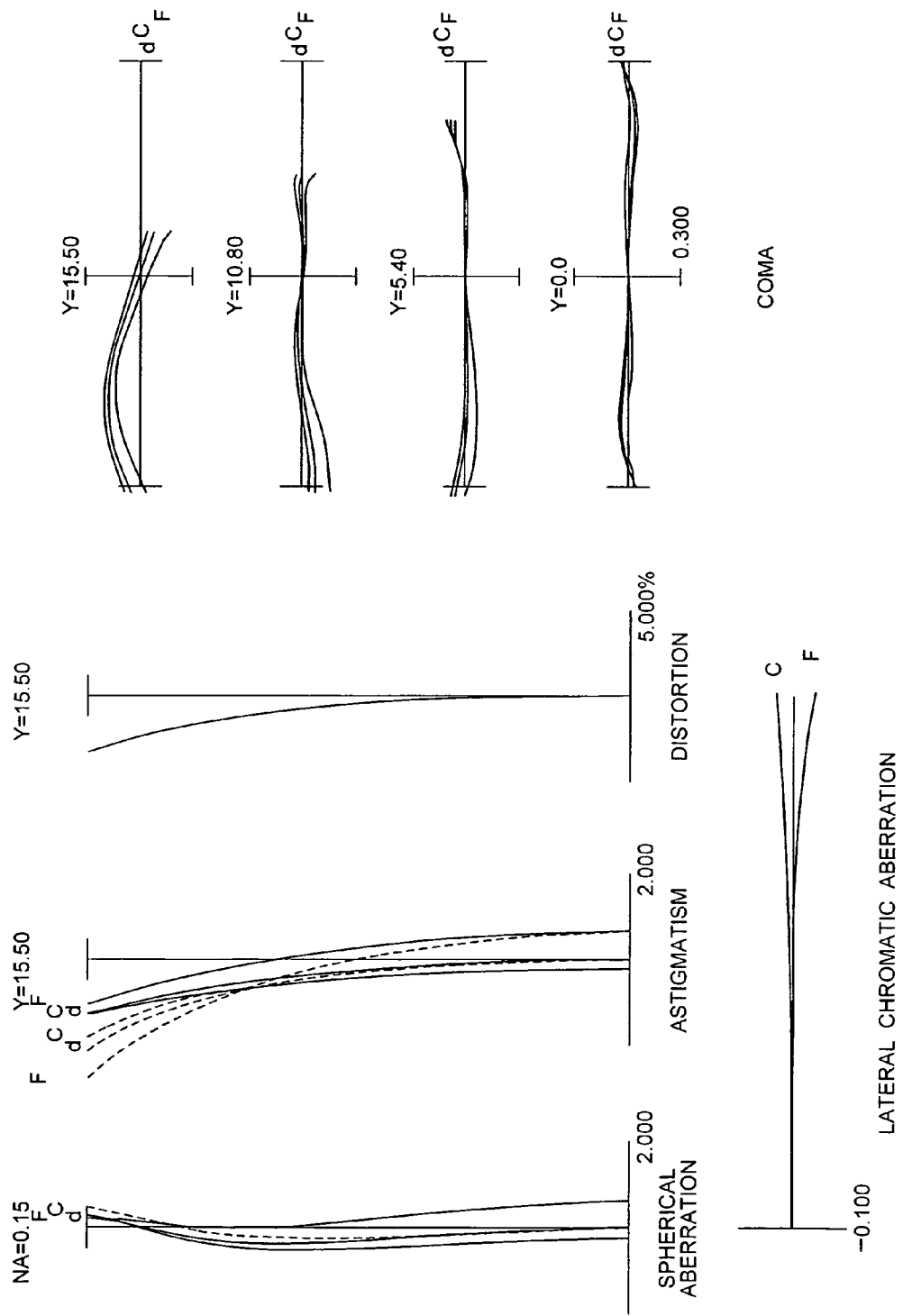
FIG. 12 graphically shows various aberrations of the eyepiece lens according to Example 3 of the present invention at diopter of +1.

FIG. 10 graphically shows various aberrations according to Example 3 at the diopter of −3, FIG. 11 at the diopter of −1, and FIG. 12 at the diopter of +1.

As is apparent from the respective graphs, various aberrations are corrected preferably. As is understood from the drawing of the eyepiece shown in FIG. 9, the aberration graphs are corresponding to the case when the light flux fully fills the effective diameter of the eyepiece lens. In the eyepiece lens according to Example 3, since coma and spherical aberration are corrected preferably, drawbacks shown in the conventional viewfinder with adjustable diopter such as degradation in optical performance under dimmer condition, and image-slide of the viewfinder upon shifting an eye from the eye point do not happen any more.

Moreover, as is shown from the aberration graphs, the eyepiece lens according to Example 3 has a merit that distortion is corrected superbly relative to the conventional eyepiece lens, so that it has another merit that nearly comparable distortion correction can be obtained even if a condenser lens locating in the vicinity of the focal plane for correcting distortion is abolished.

By the way, an eyepiece lens according to an embodiment of the present invention can be used as an eyepiece lens for a real image type viewfinder system as well as an eyepiece lens for a viewfinder of a single-lens-reflex camera.

As described above, the present invention makes it possible to provide an eyepiece lens having a large pupil diameter of 10 mm or more, securing higher magnification, equipped with a high quality diopter adjustment function at low cost.

Additional advantages and modification will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An eyepiece lens comprising: in order from an eye point side,
    a negative meniscus lens having a concave surface facing to the eye point side;
    a double convex lens; and
    a negative lens,
    diopter of the eyepiece lens being adjusted by moving the double convex lens along an optical axis,
    at least one surface of the double convex lens having an aspherical surface with positive refractive power getting weaker in accordance with increase in a distance to the surface from the optical axis, and
    the following conditional expressions being satisfied:

$0.22 < d2/f2 < 0.32$ $-4.2 < S1 < -2.6$ $0.2 < S2 < 0.35$ $-1.2 < S3 < -0.3$ where d2 denotes the thickness of the negative meniscus lens along the optical axis, f2 denotes the focal length of the double convex lens, S1 denotes a shape factor of the negative meniscus lens, S2 denotes a shape factor of the double convex lens, S3 denotes a shape factor of the negative lens, and each shape factor is expressed by the following expression:

$S = (re+rs)/(re-rs)$ where re denotes a radius of curvature of the eye point side surface and rs denotes a radius of curvature of the object side surface, and when the surface is an aspherical surface, a paraxial radius of curvature is used for the calculation.

2. The eyepiece lens according to claim 1, wherein the double convex lens is constructed by a resin material and the following conditional expressions are satisfied:

$1.5 < n2 < 1.55$ $52 < v2 < 60$ where n2 denotes refractive index of the double convex lens at d-line (wavelength $\lambda = 587.6$ nm) and v2 denotes Abbe number of the double convex lens at d-line (wavelength $\lambda = 587.6$ nm).

3. The eyepiece lens according to claim 2, wherein the following conditional expression is satisfied:

$0.28 < d4/f2 < 0.36$ where d4 denotes a thickness of the double convex lens along the optical axis.

4. The eyepiece lens according to claim 1, wherein the following conditional expression is satisfied:

$0.28 < d4/f2 < 0.36$ where d4 denotes a thickness of the double convex lens along the optical axis.

5. The eyepiece lens according to claim 1, wherein the following conditional expressions are satisfied:

$-22 < v1-v2 < -6$ $30 < v2-v3 < 35$ where v1 denotes Abbe number of the negative meniscus lens at d-line (wavelength $\lambda = 587.6$ nm), v2 denotes Abbe number of the double convex lens at d-line (wavelength $\lambda = 587.6$ nm), and v3 denotes Abbe number of the negative lens at d-line (wavelength $\lambda = 587.6$ nm).

6. An eyepiece lens comprising: in order from an eye point side,
    a negative meniscus lens having a concave surface facing to the eye point side;
    a double convex lens; and
    a negative lens,
    diopter of the eyepiece lens being adjusted by moving the double convex lens along an optical axis,
    the double convex lens being constructed by a resin material,
    at least one surface of the double convex lens having an aspherical surface with positive refractive power getting weaker in accordance with increase in a distance to the surface from the optical axis, and
    the following conditional expressions being satisfied:

$1.5 < n2 < 1.55$ $52 < v2 < 60$ $0.28 < d4/f2 < 0.36$ where n2 denotes refractive index of the double convex lens at d-line (wavelength $\lambda = 587.6$ nm), v2 denotes Abbe number of the double convex lens at d-line (wavelength $\lambda = 587.6$ nm), d4 denotes a thickness of the double convex lens along the optical axis, and f2 denotes the focal length of the double convex lens.

7. The eyepiece lens according to claim 6, wherein the following conditional expressions are satisfied:

$$0.22 < d2/f2 < 0.32$$

$$-4.2 < S1 < -2.6$$

where d2 denotes the thickness of the negative meniscus lens along the optical axis, S1 denotes a shape factor of the negative meniscus lens, and each shape factor is expressed by the following expression:

$$S = (re+rs)/(re-rs)$$

where re denotes a radius of curvature of the eye point side surface and rs denotes a radius of curvature of the object side surface, and when the surface is an aspherical surface, a paraxial radius of curvature is used for the calculation.

8. The eyepiece lens according to claim 7, wherein the following conditional expressions are satisfied:

$$-22 < v1-v2 < -6$$

$$30 < v2-v3 < 35$$

where v1 denotes Abbe number of the negative meniscus lens at d-line (wavelength $\lambda=587.6$ nm), v2 denotes Abbe number of the double convex lens at d-line (wavelength $\lambda=587.6$ nm), and v3 denotes Abbe number of the negative lens at d-line (wavelength $\lambda=587.6$ nm).

9. The eyepiece lens according to claim 6, wherein the following conditional expressions are satisfied:

$$-22 < v1-v2 < -6$$

$$30 < v2-v3 < 35$$

where v1 denotes Abbe number of the negative meniscus lens at d-line (wavelength $\lambda=587.6$ nm), v2 denotes Abbe number of the double convex lens at d-line (wavelength $\lambda=587.6$ nm), and v3 denotes Abbe number of the negative lens at d-line (wavelength $\lambda=587.6$ nm).

10. An eyepiece lens comprising: in order from an eye point side,
a negative meniscus lens having a concave surface facing to the eye point side;
a double convex lens; and
a negative lens,
diopter of the eyepiece lens being adjusted by moving the double convex lens along an optical axis,
a prism being disposed adjacent to the object side of the negative lens, and
the following conditional expressions being satisfied:

$$1.6 < n4 < 1.85$$

$$25 < v4 < 50$$

where n4 denotes refractive index of the prism at d-line (wavelength $\lambda=587.6$ nm) and v4 denotes Abbe number of the prism at d-line (wavelength $\lambda=587.6$ nm).

11. The eyepiece lens according to claim 10, wherein the following conditional expressions are satisfied:

$$0.22 < d2/f2 < 0.32$$

$$-4.2 < S1 < -2.6$$

$$0.2 < S2 < 0.35$$

$$-1.2 < S3 < -0.3$$

where d2 denotes the thickness of the negative meniscus lens along the optical axis, f2 denotes the focal length of the double convex lens, S1 denotes a shape factor of the negative meniscus lens, S2 denotes a shape factor of the double convex lens, S3 denotes a shape factor of the negative lens, and each shape factor is expressed by the following expression:

$$S = (re+rs)/(re-rs)$$

where re denotes a radius of curvature of the eye point side surface and rs denotes a radius of curvature of the object side surface, and when the surface is an aspherical surface, a paraxial radius of curvature is used for the calculation.

12. The eyepiece lens according to claim 11, wherein the double convex lens is constructed by a resin material and the following conditional expressions are satisfied:

$$1.5 < n2 < 1.55$$

$$52 < v2 < 60$$

where n2 denotes refractive index of the double convex lens at d-line (wavelength $\lambda=587.6$ nm) and v2 denotes Abbe number of the double convex lens at d-line (wavelength $\lambda=587.6$ nm).

13. The eyepiece lens according to claim 10, wherein the double convex lens is constructed by a resin material and the following conditional expressions are satisfied:

$$1.5 < n2 < 1.55$$

$$52 < v2 < 60$$

where n2 denotes refractive index of the double convex lens at d-line (wavelength $\lambda=587.6$ nm) and v2 denotes Abbe number of the double convex lens at d-line (wavelength $\lambda=587.6$ nm).

14. A method of magnifying an image of an object for observing the image, comprising:
providing an eyepiece lens that includes, in order from an eye point side, a negative meniscus lens having a concave surface facing to the eye point side, a double convex lens, and a negative lens; and
moving the double convex lens along an optical axis of the eyepiece lens to adjust diopter of the eyepiece lens, at least one surface of the double convex lens having an aspherical surface with positive refractive power getting weaker in accordance with increase in a distance to the surface from the optical axis;
wherein the following conditional expressions are satisfied:

$$0.22 < d2/f2 < 0.32$$

$$-4.2 < S1 < -2.6$$

$$0.2 < S2 < 0.35$$

$$-1.2 < S3 < -0.3$$

where d2 denotes the thickness of the negative meniscus lens along the optical axis, f2 denotes the focal length of the double convex lens, S1 denotes a shape factor of the negative meniscus lens, S2 denotes a shape factor of the double convex lens, S3 denotes a shape factor of the negative lens, and each shape factor is expressed by the following expression:

$$S = (re=rs)/(re-rs)$$

where re denotes a radius of curvature of the eye point side surface and rs denotes a radius of curvature of the object side surface, and when the surface is an aspherical surface, a paraxial radius of curvature is used for the calculation.

15. The method according to claim 14, wherein:
the double convex lens is constructed by a resin material; and
the following conditional expressions are satisfied:

$1.5 < n2 < 1.55$ $52 < v2 < 60$ where n2 denotes refractive index of the double convex lens at d-line (wavelength λ=587.6 nm), and v2 denotes Abbe number of the double convex lens at d-line (wavelength λ=587.6 nm).

16. The method according to claim 14, wherein:
the following conditional expression is satisfied:

$0.28 21 d4/f2 < 0.36$ where d4 denotes a thickness of the double convex lens along the optical axis.

17. A method of magnifying an image of an object for observing the image, comprising:
providing an eyepiece lens that includes, in order from an eye point side, a negative meniscus lens having a concave surface facing to the eye point side, a double convex lens constructed by a resin material, and a negative lens; and
moving the double convex lens along an optical axis of the eyepiece lens to adjust diopter of the eyepiece lens, at least one surface of the double convex lens having an aspherical surface with positive refractive power getting weaker in accordance with increase in a distance to the surface from the optical axis;
wherein the following conditional expressions are satisfied:

$1.5 < n2 < 1.55$ $52 < v2 < 60$ $0.28 < d4/f2 < 0.36$ where n2 denotes refractive index of the double convex lens at d-line (wavelength λ=587.6 nm), v2 denotes Abbe number of the double convex lens at d-line (wavelength λ=587.6 nm), d4 denotes a thickness of the double convex lens along the optical axis, and f2 denotes the focal length of the double convex lens.

18. A method of magnifying an image of an object for observing the image, comprising:
providing an eyepiece lens that includes, in order from an eye point side, a negative meniscus lens having a concave surface facing to the eye point side, a double convex lens, a negative lens, and a prism disposed adjacent to the object side of the negative lens;
moving the double convex lens along an optical axis of the eyepiece lens to adjust diopter of the eyepiece lens;
wherein the following conditional expressions are satisfied:

$1.6 < n4 < 1.85$ $25 < v4 < 50$ where n4 denotes refractive index of the prism at d-line (wavelength λ=587.6 nm) and v4 denotes Abbe number of the prism at d-line (wavelength λ=587.6 nm).

* * * * *